United States Patent [19]
Johnson et al.

[11] Patent Number: 5,237,627
[45] Date of Patent: Aug. 17, 1993

[54] NOISE TOLERANT OPTICAL CHARACTER RECOGNITION SYSTEM

[75] Inventors: Dan S. Johnson; Mark D. Seaman, both of Greeley, Colo.

[73] Assignee: Hewlett-Packard Company, Palo Alto, Calif.

[21] Appl. No.: 722,054

[22] Filed: Jun. 27, 1991

[51] Int. Cl.$^5$ .................................. G06K 9/00
[52] U.S. Cl. ............................. 382/30; 382/25; 382/22
[58] Field of Search ............... 382/30, 34, 9, 13, 24, 382/25, 22, 21

[56] References Cited

U.S. PATENT DOCUMENTS

| | | | |
|---|---|---|---|
| 4,718,102 | 1/1988 | Crane et al. | 382/30 |
| 4,764,973 | 8/1988 | O'Hair | 382/14 |
| 4,860,376 | 8/1989 | Tanaka et al. | 382/57 |
| 4,972,499 | 11/1990 | Kurosawa | 382/38 |
| 4,987,603 | 1/1991 | Ohnishi et al. | 382/25 |
| 5,034,989 | 7/1991 | Loh | 382/24 |

OTHER PUBLICATIONS

"Images to Outlines, Chain Link Coding and Segmentation for Raster Scan Devices", Cederberg, *Computer Graphics and Image Processing*, vol. 10, No. 3, 1979, pp. 224–234.

"Fast Polygonal Approximation of Digitized Curves", Gonzales and Sklansky, *Pattern Recognition*, vol. 12, 1981, pp. 327–331.

*Primary Examiner*—Michael T. Razavi
*Assistant Examiner*—Yon J. Couso

[57] ABSTRACT

Disclosed is a system of optical character recognition that first segments a page image into character images. A set of features is extracted and compared to proto-features from a template in order to classify a character, and convert it into a character code. This comparison is performed by comparing each feature of a character image to each proto-feature of each template to create a match rating list which is sorted in descending order. The top match rating and any close ratings are selected and output. To create the ratings, the angles and lengths of the features and proto-features are compared and then the result is normalized to a specific range of values.

13 Claims, 10 Drawing Sheets

NOISE TOLERANT OPTICAL CHARACTER RECOGNITION SYSTEM

CROSS-REFERENCE TO RELATED APPLICATIONS

This application is related to application Ser. No. 07/875,000 which is continuation of 07/599,522 of Dan S. Johnson for Noise Tolerant Optical Character Recognition System, filed Oct. 17, 1990; application Ser. No. 07/705,838 of Oscar A. Zuniga for Automatic Separation of Text from Background in Scanned Images of Complex Documents, filed May 28, 1991, now pending; and application Ser. No. 07/898,392 now U.S. Pat. No. 5,179,599, of Lynn J. Formanek for Dynamic Thresholding System for Documents Using Structural Information of the Documents, filed Jun. 17, 1991; all owned by the same entity.

FIELD OF THE INVENTION

This invention relates to pattern recognition systems and more particularly to computerized pattern recognition systems. Even more particularly, the invention relates to computerized optical character recognition systems.

BACKGROUND OF THE INVENTION

Optical character recognition, or OCR, is the process of transforming a graphical bit image of a page of textual information into a text file wherein the text information is stored in a common computer processable format, such as ASCII. The text file can then be edited using standard word processing software.

In the process of transforming each of the characters on the page from a graphical image into an ASCII format character, prior art OCR methods first break the graphical page image into a series of graphical images, one for each character found on the page. They then extract high level features of each character and classify the character based on those features. If the characters on the page are of a high quality, such as an original typed page, these simple processing methods will work well for the process of converting the characters. However, as document quality degrades, such as through multiple generations of photocopies, carbon copies, facsimile transmission, or in other ways, the characters on a page become distorted causing simple processing methods to make errors. For example, a dark photocopy may join two characters together, causing difficulty in separating these characters for the OCR processing. Joined characters can easily cause the process that segments characters to fail, since any method which depends on a "gap" between characters cannot easily distinguish characters that are joined.

Light photocopies produce the opposite effect. Characters can become broken, and appear as two characters, such as the character "u" being broken in the bottom middle to create two characters, each of which may look like the "i" character. Also, characters such as the letter "e" may have a segment broken to cause them to resemble the character "c".

Early prior art OCR methods did not extract character features from a character, instead they simply compared a graphical bit map of the character to a template bit map of a known character. This method was commonly called "matrix matching". One problem with matrix matching is that it is very sensitive to small changes in character size, skew, shape, etc. Also, this technology was not "omni font", that is, it had to be carefully trained on each type font to be read and would not generalize easily to new type fonts.

To solve the "omni font" problem, prior art methods begin to extract higher level features from a character image. The goal was to select a set of features which would be insensitive to unimportant differences, such as size, skew, presence of serifs, etc., while still being sensitive to the important differences that distinguish between different types of characters. High level features, however, can be very sensitive to certain forms of character distortion. For example, many feature extractors detect the presence of "closures", such as in the letters "e", "o", "b", "d", etc., and the feature extractors use this information to classify the character. Unfortunately, a simple break in a character can easily cause a closure to disappear, and the feature extractor method that depends on such closures would probably classify the character incorrectly.

Often the high level feature representation of a character contains very few features. Therefore, when a feature is destroyed, such as a break in a closure, there is insufficient information left to correctly classify the character.

There is need in the art then for an optical character recognition system that classifies characters by creating a set of features that is insensitive to character segmentation boundaries. There is further need in the art for such a system that creates features having a low enough level to be insensitive to common noise distortions. Another need in the art is for such a system that creates a sufficient number of features that some will remain to allow character classification even if others are destroyed by noise. A still further need in the art is for such a system that provides a set of features that are insensitive to font variations. The present invention meets these needs.

A description of other aspects of OCR can be found in the following applications;

(a) Application Ser. No. 07/599,522 of Dan S. Johnson for Noise Tolerant Optical Character Recognition System, filed Oct. 17, 1990;

(b) Application Ser. No. 07/705,838 of Oscar A. Zuniga for Automatic Separation of Text from Background in Scanned Images of Complex Documents, filed May 28, 1991; and (c) Application Ser. No. 07/898,392, of Lynn J. Formanek for Dynamic Thresholding System for Documents Using Structural Information of the Documents, filed Jun. 17, 1991;

each of which is specifically incorporated herein by reference for all that is disclosed therein.

SUMMARY OF THE INVENTION

It is an aspect of the present invention to provide a system for recognizing textual characters from a bit image of a page of text.

It is another aspect of the invention to define a set of features for each of the characters on the page of text.

Another aspect is to define such a set of features that are at a low enough level that they are insensitive to common noise distortions.

Yet another aspect is to define such a set of features for each character within a word so that if a few features are destroyed by noise, the remaining features will still be sufficient to yield a correct classification.

A further aspect of the invention is to provide a set of features that are at a high enough level that they are insensitive to font variations, such as size, shape, skew, etc.

The above and other objects of the invention are accomplished in a method of optical character recognition that first segments a page image into character images. A set of features is extracted by traversing the outlines of the dark regions in a character image, keeping the dark area to the left, to identify small sections called features. Once extracted, the features of the unknown character are compared to features of a prototype character from a template in order to classify the unknown character, and convert it into a character code. The features of the prototype character are called proto-features.

The comparison of the features and the proto-features is performed by selecting the features from a character image to be analyzed. Next, one of the templates is selected and each of the features from the character image is compared to each of the proto-features in the template to create an average feature match evidence. Each of the proto-features is then compared to each of the features to create an average proto match evidence. These two evidences are then summed and divided by the total feature and proto-feature lengths to create a match rating. The features are then compared to all other templates to create a match rating list which is sorted into descending order. The top match rating is selected for output, and any ratings that are very close to the top rating are also output to allow a dictionary look-up routine or a lexical analyzer to make the final selection.

To create the match evidences, the angles and lengths of the features and proto-features are compared and then the result is normalized to a specific range of values.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Optical character recognition, or OCR, is a process that transforms an image of a page of textual information into a text file on a computer. The text file can then be edited using standard word processors on the computer system. The process first involves "training" the OCR machine to segment characters within a page image, extract character features and build a set of templates for each class of characters. For example, a class for the character "a" might include a template for each font the OCR machine is capable of recognizing. After the templates have been created, a page of unknown textual information is scanned, the characters are segmented, features from each of the characters are extracted and then these features are compared to the templates created earlier in order to classify the characters.

The training process is usually performed by the designers of the OCR machine. Its purpose is to "teach" the machine what the "shapes" of the different characters look like. When several character templates match the incoming character fairly well, the character classifier can output several choices for the character. Other processes, such as dictionaries and lexical rules, can be used to decide between the choices for a particular character. Therefore, it is important for the character classifier within an OCR machine to be able to pass multiple choices when it is unsure of a character classification.

On high-quality documents, simple algorithms will work well for segmentation, feature extraction, and character classification. However, as document quality degrades, the characters on the page become distorted and simple algorithms begin to make errors. Causes of document quality degradation include multiple generation photocopies, small point sizes, carbon copies, fax, dot matrix printers, etc.

Figure 1:
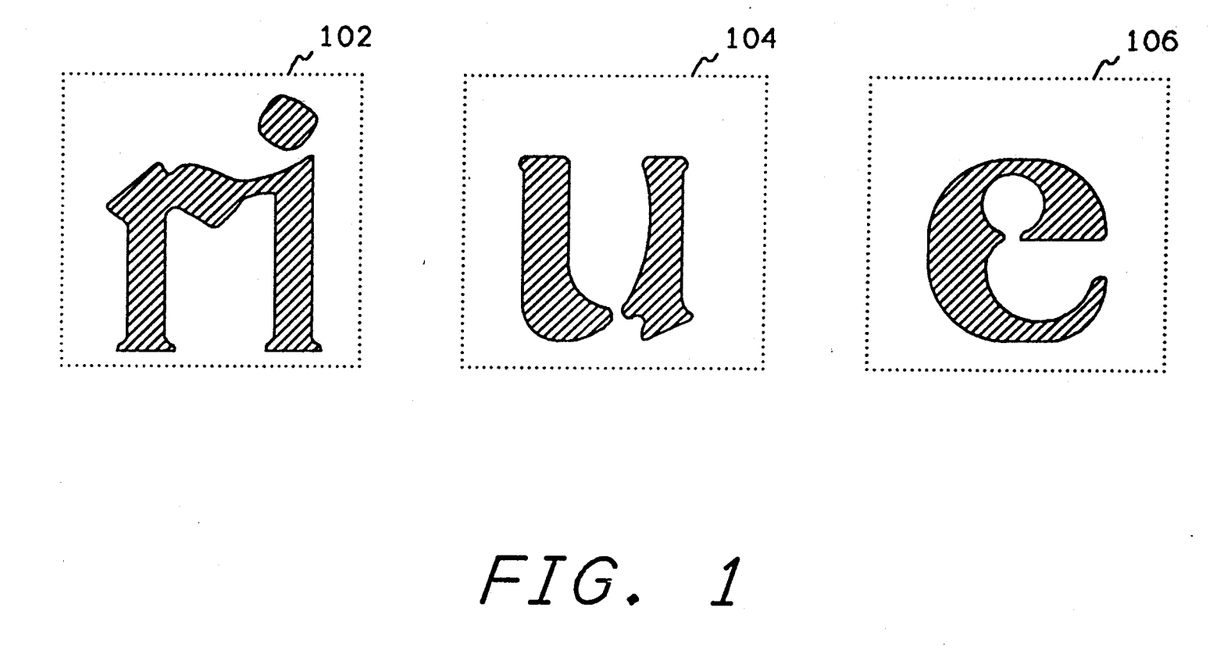
FIG. 1 shows an example of character distortions that commonly occur because of noise and illustrates the problems solved by the present invention.

FIG. 1 shows an example of character distortions that commonly occur because of noise and illustrates the problems solved by the present invention. Referring now to FIG. 1, the characters enclosed by the dotted outline 102 are the characters "r" and "i" which have been "joined" because of noise, as might occur for example, by a dark photocopy. The character within the dotted outline 104 is the character "u" which has been broken because of noise such as might be caused by a light photocopy. A light photocopy of the character "e" could also result in the outline enclosed in the dotted line 106. This type of noise distortion might cause prior art methods to classify this character as a "c".

To solve the character classification problems defined by the characters of FIG. 1, the present invention uses a new method of optical character recognition that first segments a page image into character images. Character image separation is well known in the art, and will not be further described here. The present invention obtains a set of features by extracting the outlines of the "black" regions in a character image, and then further dissecting each outline into small sections called features.

Early OCR methods did not use a feature extractor. They simply compared the bit map image of the character against the template bitmaps of known characters. This method was commonly called "matrix-matching".

The problem with matrix-matching is that it is too sensitive to small changes in character size, skew, shape, etc. The technology was not "omni-font". That is, it had to be carefully trained on each font to be read and would not generalize well to new fonts. To solve the omni-font problem, designers of OCR machines began to extract higher level features from the character image. Some example high level features are the "closures" such as in "e", "a", "b", "d", etc., or "bays" such as in "n", "u", "m", etc. The goal was to select a set of features which would be insensitive to unimportant differences such as size, skew, presence of serifs, etc., while still being sensitive to the important differences that distinguish between characters of different fonts.

The problem with high level features is that they can be very sensitive to certain forms of character distortion. For example, a simple break in a character, such as the "e" 106 of FIG. 1, can easily cause a closure to disappear. Any method that depended heavily on closures would probably classify this character as a "c".

The solution of the present invention is to use features which are at a lower level than closures, bays, etc., but at a higher level than bit maps. The invention uses very small features, features which approximate the size of the smallest possible outline segment which can still convey meaningful information about a character. These features are compared to prototype features in the character templates. These prototype features are also called proto-features. In the preferred embodiment, the proto-features are the same size or larger than features, however, in other embodiments, they could be smaller. Also, in other embodiments, larger features could be used.

Figure 2:
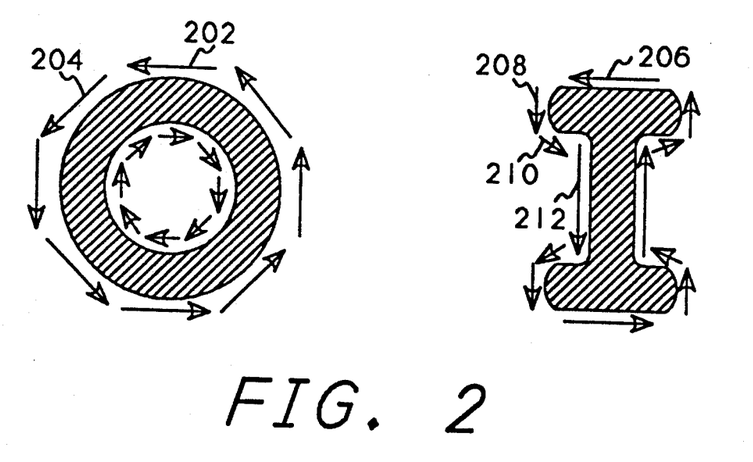
FIG. 2 shows a set of template proto-features for the letters "o" and "I"

The invention defines proto-features within a template to be an approximation of the outline of a character. In the preferred embodiment, a straight line approximation is used, however, other approximations, such as for example arcs, could be used. FIG. 2 shows a set of template proto-features for the letters "o" and "I". Each straight line segment corresponds to one proto-feature. Referring now to FIG. 2, the letter "o" is shown having proto-features 202 and 204. The proto-features ar formed by starting at a point on the outline of the character and traversing the character in a direction such that the black area of the character is on the left side of the arrow. Proto-features are formed using the eight points of the compass, i.e. at 0 degrees, 45 degrees, 90 degrees, etc., therefore when the outline of the character changes to a new eighth compass point, a new proto-feature will be started. In the case of the letter "o", there are 8 proto-features on the outside of the outline and 8 proto-features on the inside of the outline. In forming the proto-features for the letter "I" the arrows traverse in the same manner and continue as long as a straight line approximation is appropriate. In this manner, proto feature 206 is created along the top outline of the character, and when the character outline changes direction downward, proto feature 208 is created. As the outline swings inward, proto-feature 210 is created, and as the outline descends vertically, a very long proto-feature 212 is created. Proto-features continue to be created in this manner until the entire outline of the character is traversed.

Figure 3:
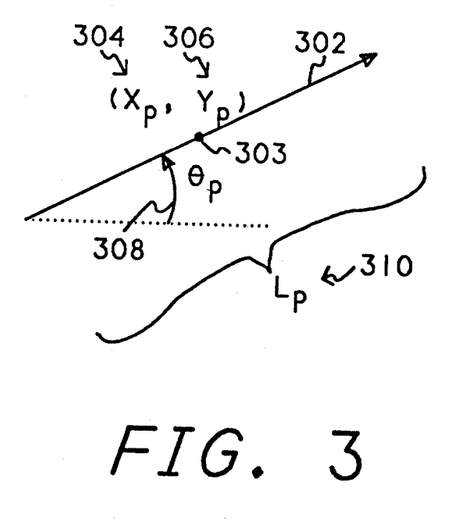
FIG. 3 shows a diagram of a proto-feature created for a template character.

FIG. 3 shows an example of how proto-features are defined. Referring now to FIG. 3, a proto-feature, as represented by arrow 302, contains a midpoint 303 which is represented by its $X_p$ and $Y_p$ coordinates 304 and 306. The angle $\Theta_p$ 308 of the proto-feature 302 is recorded relative to the direction east. That is, east is 0 degrees, with degrees being counted counterclockwise until a full circle is complete. The degrees of the angle are converted to a value between 0 and 1 where 0 represents 0 degrees and 1 represents 360 degrees. A length 310 of the proto-feature 302 is also recorded for the proto-feature. Thus a proto-feature is defined by the X-Y coordinates of its center, its angle, and its length.

Additional parameters are derived for each proto-feature to improve computational speed when comparing features to proto-features. These parameters are defined as A, B, C, Xmin, Xmax, Ymin, and Ymax.

A, B, and C are the normalized parameters for the general form of a line, i.e. Ax+By+C=0. A, B, and C are computed as follows:

---
SLOPE = tan($\theta_p$)
INTERCEPT = $Y_p$ − SLOPE * $X_p$
NORMALIZER = 1 / SQRT(SLOPE**2 + 1)
A = SLOPE * NORMALIZER
B = 0 − NORMALIZER
C = INTERCEPT * NORMALIZER ---
where SQRT means take the square root of the equation in parenthesis,
**2 means square the value of SLOPE,
* means multiplication,
/ means division,
+ means addition,
− means subtraction, and
tan means take the tangent.

Xmin, Xmax, Ymin, and Ymax describe a padded bounding box containing the proto-feature. The bounding box is used to quickly eliminate feature/proto-feature pairs from further consideration when they are not a good match. This bounding box is computed as follows:

---
Xpad = MAX[($L_p$ / 2 + TPAD) * |cos $\theta_p$|, OPAD * |sin $\theta_p$|]
Ypad = MAX[($L_p$ / 2 + TPAD) * |sin $\theta_p$|, OPAD * |cos $\theta_p$|]
Xmin = $X_p$ − Xpad
Xmax = $X_p$ + Xpad
Ymin = $Y_p$ − Ypad
Ymax = $Y_p$ + Ypad ---
where * means multiplication,
/ means division,
+ means addition,
− means subtraction,
MAX means take the maximum of the values in the brackets separated by commas,
sin means take the sine,
cos means take the cosine,
| | means take the absolute value,
TPAD is a constant value of tangential pad, which is 0.5 times the feature length in the preferred embodiment, and
OPAD is a constant value of orthogonal pad, which is 2.5 times the feature length in the preferred embodiment.

OPAD is a constant value of orthogonal pad, which is 2.5 times the feature length in the preferred embodiment.

TPAD and OPAD are used to provide a small amount of additional space around a proto-feature which allows close features to still be considered.

Figure 4:
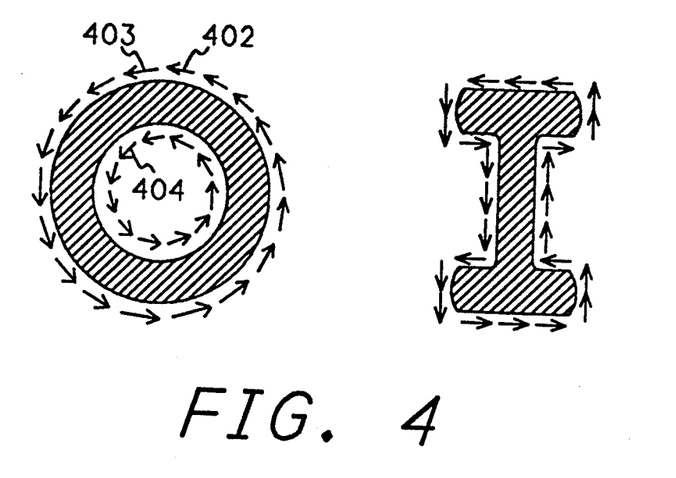
FIG. 4 shows an example set of features that could be extracted from analyzing the letters "o" and "I"

FIG. 4 shows an example set of features that would be extracted from the letters "o" and "I", as those characters are being analyzed on an unknown page of text. As a character is being analyzed, the features extracted are much smaller than the proto-features that are created for a character template. Referring now to FIG. 4, feature 402 would be created by starting at an arbitrary point on the outline on the letter "o", and placing the center of the first feature at this arbitrary point. One method of picking an arbitrary point would be to select the portion of the outline that is located at the largest Y coordinate value. The angle of the feature is defined as the angle of the outline of the dark area of the character at the point. The feature extractor then moves along the outline, keeping the dark area on the left, for a distance of one feature length and places the center of the second feature, feature 403, at this new point. Unlike proto-features, all features from a character being analyzed are of a fixed length. This length could be any length so long as it is consistent, and in the preferred embodiment, the feature length is one-tenth of the x-height (defined below) of the current line of text. This process would continue until the entire outline has been traversed to create all the features around the outline. The process would be performed for all outlines, including the inner outline to create features 404, etc.

Similarly, an arbitrary point would be picked on the "I" character and features would be created in the same manner by traversing the outline.

Figure 5:
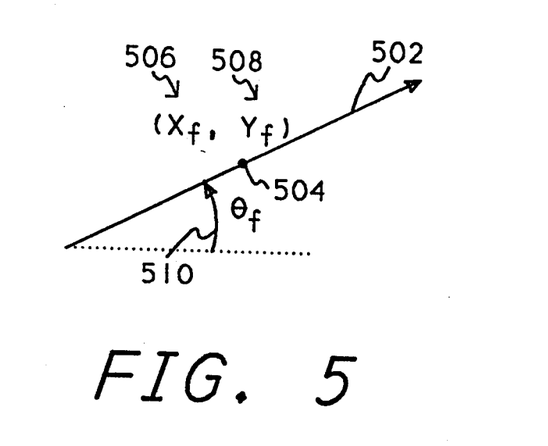
FIG. 5 shows a diagram of a feature extracted from a character.

FIG. 5 shows a diagram of a feature extracted from a character being analyzed. When features are extracted from a character being analyzed, the features are all of the same, fixed, length. Therefore, no length parameter is needed for a feature extracted from a character being analyzed. Referring now to FIG. 5, a feature 502 has a midpoint 504 which is defined by its $X_f$ coordinate 506 and its $Y_f$ coordinate 508. The angle of the feature 502, $\Theta_f$ 510, is specified in the same manner as the angle $\Theta_p$ 308 with respect to proto-features.

Figure 6:
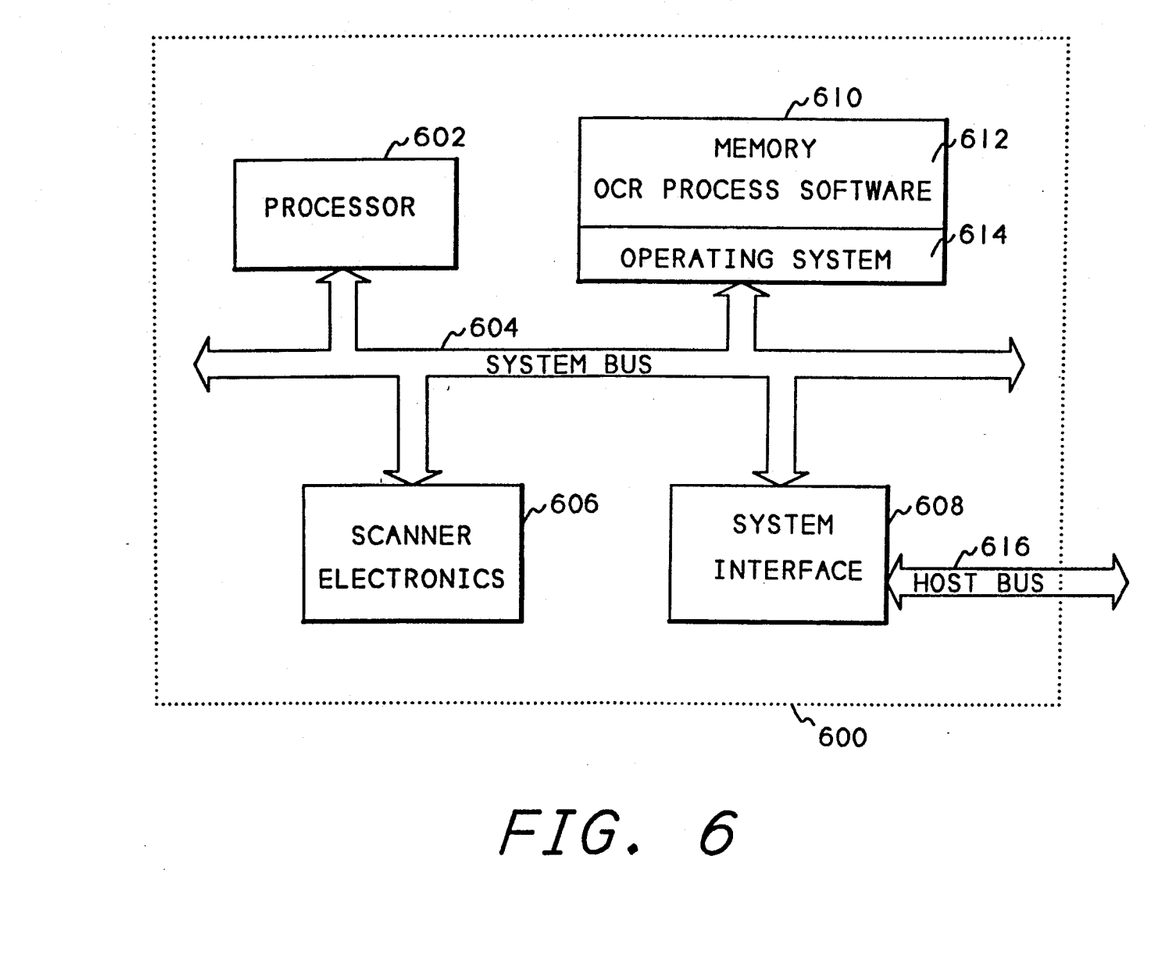
FIG. 6 shows a block diagram of the hardware of the present invention.

FIG. 6 shows a block diagram of the hardware of the present invention. Referring now to FIG. 6, a scanning device 600 contains a processor 602 which communicates to other elements of the scanning device 600 over a system bus 604. Scanner electronics 606 scan a page of textual information and produce a qraphical bit image of the contents of the page. Memory 610 contains the OCR process software 612 of the present invention which uses an operating system 614 to communicate to the scanner electronics 606, and to communicate with a host computer system over a host bus 616 through system interface electronics 608. The OCR process software 612 reads the pixels of the graphical bit image from the scanner electronics 606, processes that image according to the method of the present invention, and sends the result to a host system over the host bus 616. The OCR process software could also run in the host system.

Figure 7:
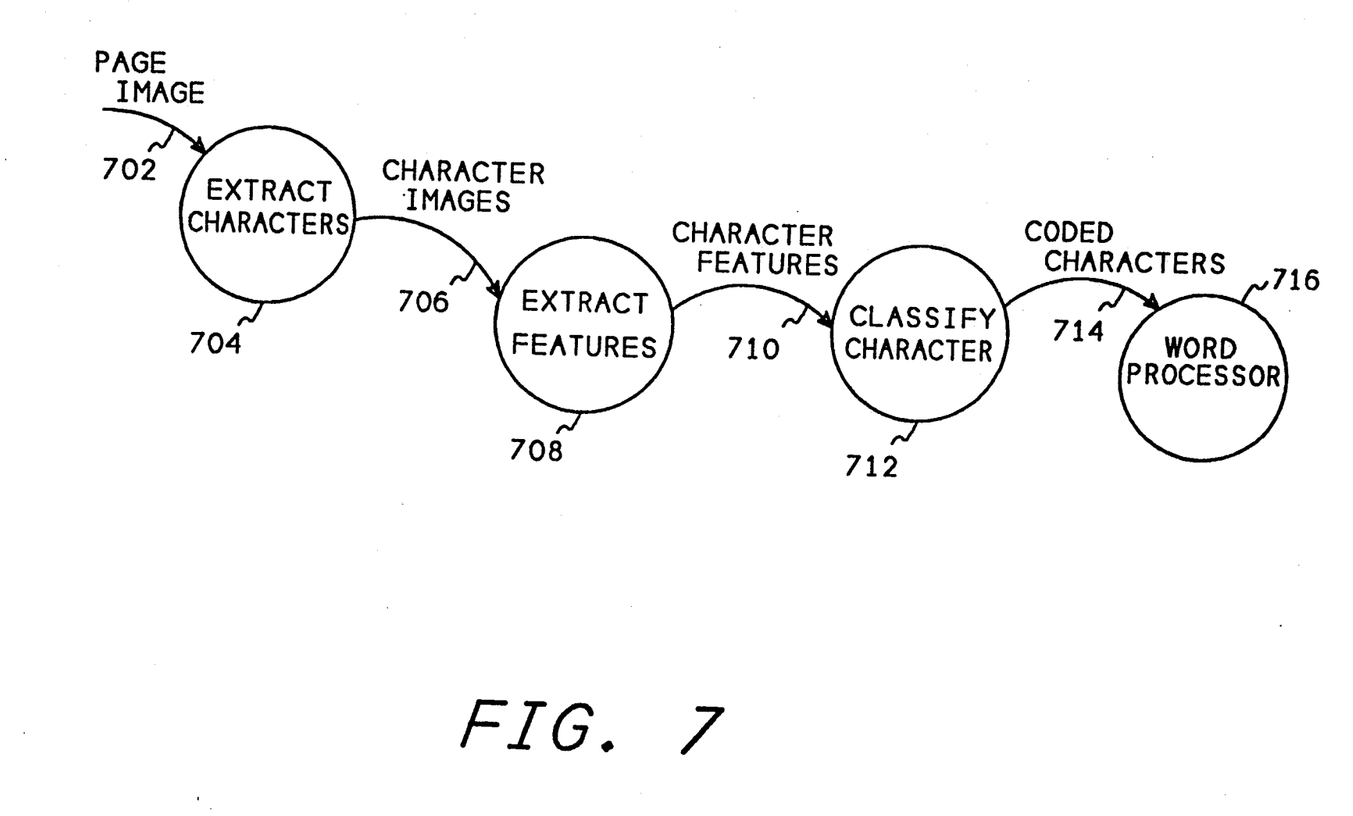
FIG. 7 shows a flow diagram of the overall process of the present invention.

FIG. 7 shows a flow diagram of the overall process of the present invention. Referring now to FIG. 7, a page image 702 is received from the scanner electronics 606 (FIG. 6). This page image is processed by an extract character process 704 which identifies each individual character on a page and places that character into a character image data stream 706. The extraction of characters is well known in the art. The character images 706 are sent to an extract features process 708 of the present invention. The extract features process 708 will be described in detail with respect to FIG. 8. The extract features process 708 creates a list of character features 710 which is sent to a classify character process 712. The classify character process 712 will be described below with respect to FIGS. 9 through 12. The output of the classified character process 712 is a coded characters data stream 714 which contains one or more choices for each character being analyzed. This output is sent to a word processor 716 where it is edited and displayed by the user of the system. The output may be sent through a host system bus to a word processor within a host system.

Figure 8:
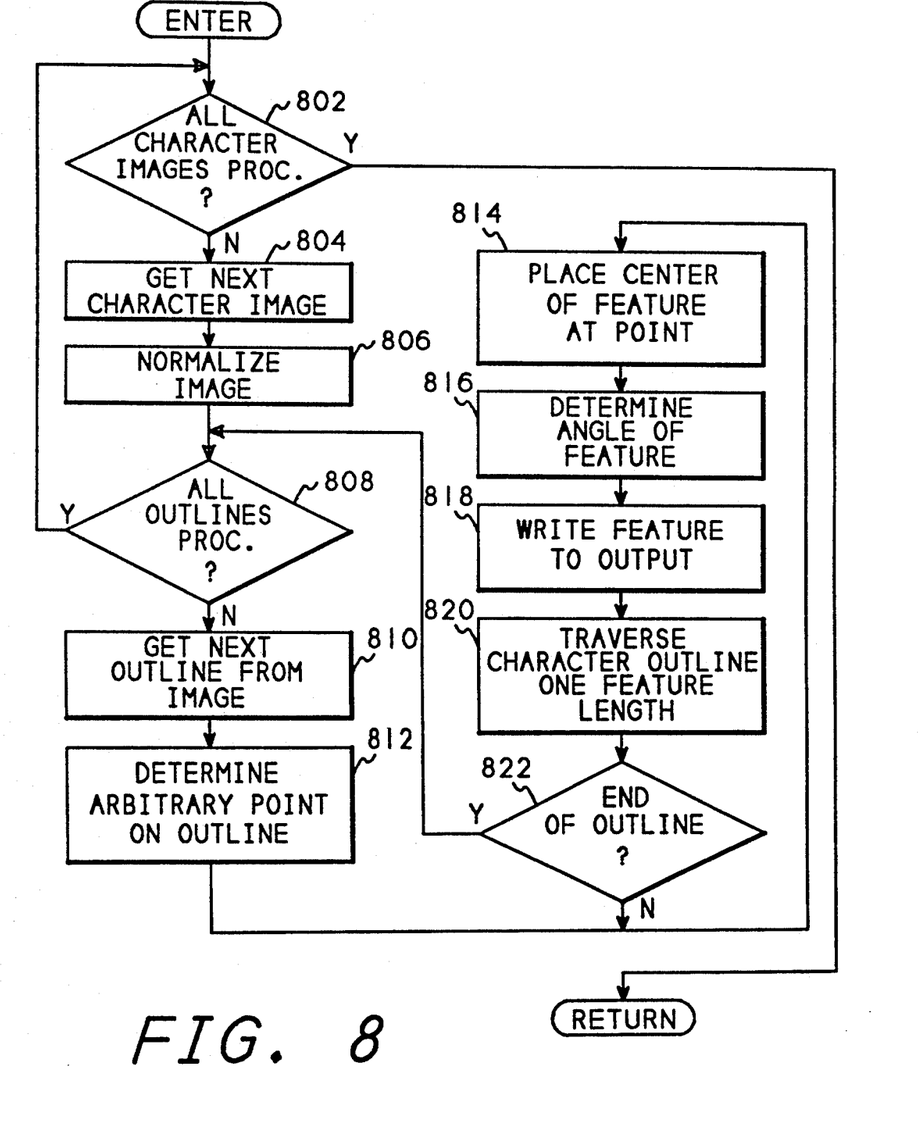
FIG. 8 shows a flowchart of the extract features process of FIG. 7.

FIG. 8 shows a flow chart of the extract features process of FIG. 7. FIG. 8 is called after character images 706 (FIG. 7) have been created by the extract characters process 704. Referring now to FIG. 8, after entry, block 802 determines whether all character images have been processed. If more character images remain to be processed, block 802 transfers to block 804 which gets the next character image from the character images data stream 706 (FIG. 7). Block 806 then normalizes the character image.

When proto-features and features are created, as defined above with respect to FIGS. 2 through 5 respectively, the location of the feature is defined by an X and Y coordinate. The ranges for X and Y depend upon the coordinate system used in the matching process. Many different coordinate systems are possible. It is desirable to choose a coordinate system in which characters have been normalized to a constant size. This allows the character classification process to be insensitive to size variation in the characters. There are two basic techniques which can be used to normalize characters, either of which will work with the system of the present invention. The only requirement is that the same form of normalization be used for both features and proto-features.

One such normalization technique is line normalization, where all characters within a line of text are scaled by a single factor. Scaling is uniform in both the X and Y directions, and the scale factor is chosen to force the X-height of the line, that is, the height of a lower case x character in the font, to be a constant. In the preferred embodiment, this constant is 0.5. The base line of the text is also translated so that the position of the baseline for all characters on a line is a constant. In the preferred embodiment, this constant is zero.

A second technique is character normalization, where each character is individually scaled to a fixed size. This scaling can be anisotropic, that is, using different scale factors in the X and Y directions. Some character normalization techniques scale the bounding box of a character to a fixed size. Other techniques compute the radius of gyration of the character shape about the center of mass in both the X and Y directions and then scale the character according to these numbers. In the preferred embodiment, the character is scaled to a range of 0 to 1.

After normalizing the character image, control transfers to block 808 which determines whether all outlines of the character image have been processed. Some characters inherently have multiple outlines, such as the character "i", which has an outline for the base part and an outline for the "dot". In other situations, a character may have multiple outlines due to distortion as described above with respect to FIG. 1. If an outline remains to be processed, block 808 transfers to block 810 which gets the next outline from the image. Block 812 then determines an arbitrary point on the outline to start feature extraction. As described above with respect to FIG. 4, the features extracted from a character being analyzed may be extracted starting at any arbitrary point on the outline. After determining an arbitrary point, block 812 transfers to block 814 which places the center of the feature at the point just selected. Block 816 determines the angle of the feature by determining the tangent to the dark portion of the outline at the point just selected. Block 818 then writes the feature statistics just collected, that is, the X,Y location of the center of the feature, and the angle of the feature, to the character features data stream 710 (FIG. 7). Block 820 then traverses along the character outline for one feature length. That is, the outline is followed keeping the dark portion of the outline to the left of the direction being followed, until the fixed length of a feature has been traversed. After traversing one feature length, block 820 transfers to block 822 which determines whether the end of the outline has been reached and if not, block 822 transfers back to block 814 to create a new feature at the new location point on the outline. After the entire outline has been traversed, block 822 transfers back to block 808 to determine whether additional outlines exist within the character. After all outlines within the character image have been processed, block 808 transfers back to block 802 to determine if additional characters remain in the character images data stream 706 (FIG. 7). After all character images have been processed, FIG. 8 returns to its caller.

FIGS. 9 through 12 show flow charts of the classify character process 712 (FIG. 7). The method involves matching each feature extracted from a character being analyzed to each proto-feature within a template, to determine if the two are "similar". Similarity is determined by the difference in the angles between the feature and the proto-feature, as well as the distance from the feature to the proto-feature. The similarity number is then normalized to the range of zero to one to create a match evidence. A match evidence of zero means that there is no evidence that the feature matches the proto-feature, and a match evidence of one means that the feature is a perfect match to the proto-feature. After the evidence is determined, a match rating is computed by comparing all the features to the proto-features within the templates, and then by also comparing all the proto-features of a template to the features within the character being analyzed. Both cases must be analyzed in order to make sure that the character being analyzed is neither a subset nor a superset of the proto-features within the template. After these two comparisons are made, a match rating of the features of the character being analyzed to the proto-features within this template is computed. The character image is then compared to the next template, until it has been compared to all templates possible. After all these comparisons are made, the match rating with the highest numbers are sent as the coded characters data stream 714 (FIG. 7) The details of this method are described below.

Figure 9:
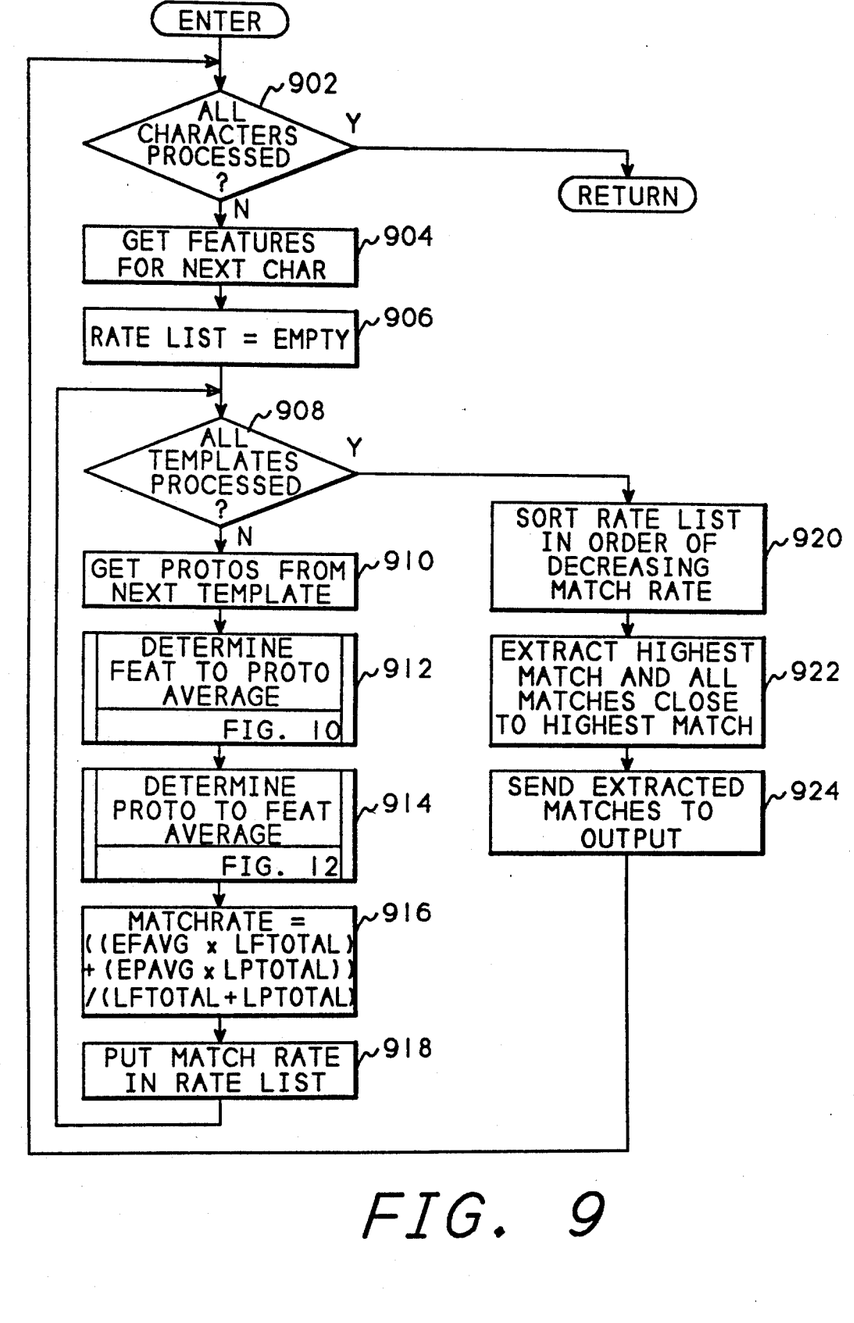
FIG. 9-12 shows a flowchart of the classify character process of FIG. 7.

FIG. 9 is a flow chart of the top level processing module of the classify character process. Referring now to FIG. 9, after entry, block 902 determines whether all characters have been processed and if not, transfers control to block 904 which gets the character features for the next character. Block 906 then sets a RATELIST variable to "empty" and block 908 determines whether all templates have been processed against this character. If all templates have not been processed against this character, block 908 transfers to block 910 which gets the proto-features from the next template. Block 912 then calls FIG. 10 to match the features from the character being analyzed to the proto-features of the template. Block 914 then calls FIG. 12 to match the proto-features from the template to the features from the character being analyzed, and block 916 then determines the match rating for this character and template combination. The match rating is determined by the following formula:

$$\text{RATING} = \frac{EFAVG * LFTOTAL + EPAVG * LPTOTAL}{LFTOTAL + LPTOTAL}$$

The above formula computes the match rating as a weighted average of the average feature evidence (EFAVG) and the average proto evidence (EPAVG). This will be a number between zero and one where one is a perfect match and zero is no match. The feature evidence is weighted by the total length of all features (LFTOTAL) and the proto-features evidence is weighted by the total length of all proto-features (LPTOTAL).

After computing the match rating for this character/template combination, block 918 puts this match rating in the RATELIST and transfers back to block 908 to process the next template. After the character image has been processed against all templates, block 908 transfers to block 920 which sorts the RATELIST in order of descending match rating. Block 922 then extracts the highest matches and all matches that are close to the highest match. In this manner, the method can output the best possible choices for the character. In the preferred embodiment, the character represented by the highest match rating is output, and all characters that are within 0.15 of the highest match rating are considered "close" and are also output.

After selecting the character with the highest match rating, and any characters that are close to the highest match rating, block 924 sends the coded characters for the extracted matches, such as coded characters from the ASCII character set, to the output data stream 714 (FIG. 7) before returning to block 902 to process the next character. After all characters have been processed, block 902 returns to its caller to allow a higher level of character level classification to proceed.

Figure 10:
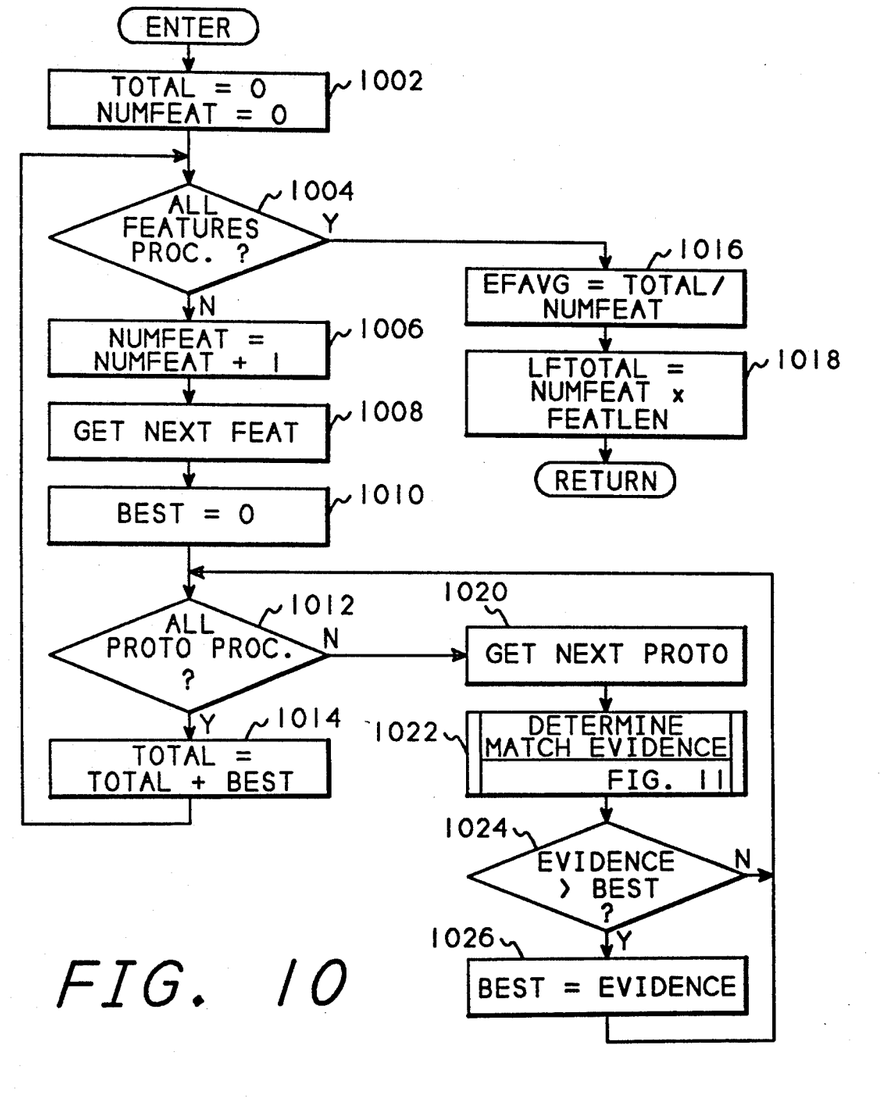
Figure 11:
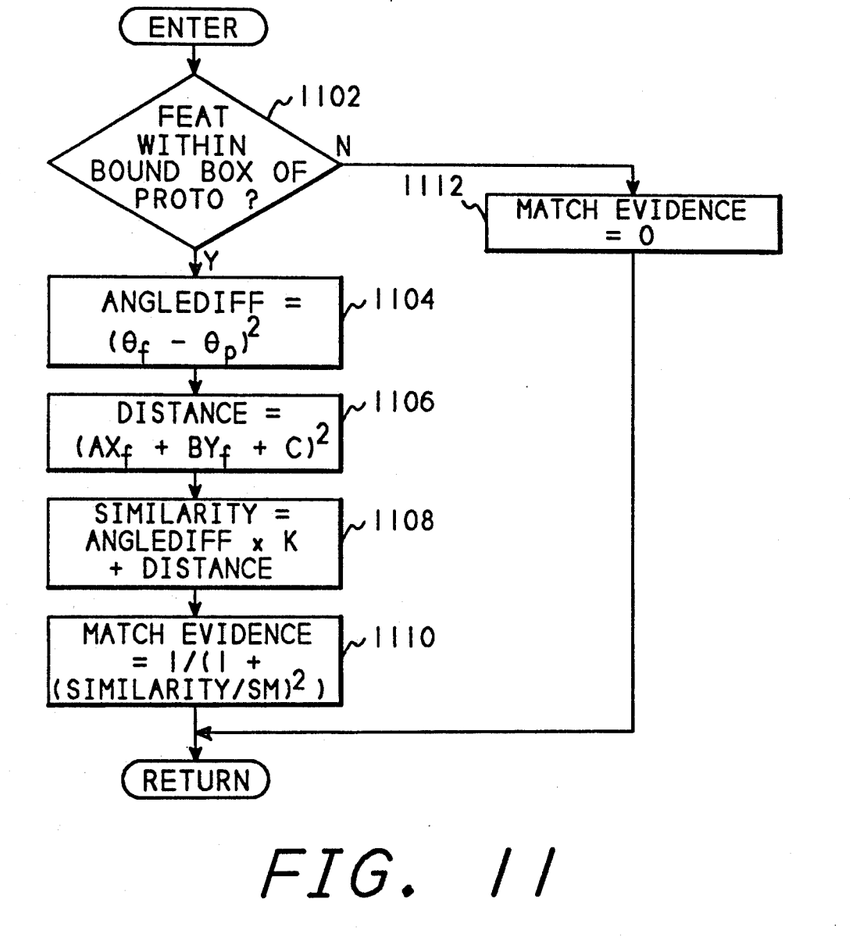

FIG. 10 shows a flow chart of the determine features to proto average called from block 912 of FIG. 9. Referring now to FIG. 10, after entry, block 1002 sets a variable TOTAL equal to zero and sets another variable NUMFEAT, which represents the number of features, equal to zero. Block 1004 then determines whether all features of the character being analyzed have been processed, and if not, block 1004 transfers to block 1006 which increments the value of the variable NUMFEAT. Block 1008 then gets the next feature and block 1010 sets a value of a variable BEST equal to zero. Block 1012 then determines whether all proto-features of the template have been processed and if not, transfers to block 1020 which gets the next proto-feature. Block 1022 then calls FIG. 11 to determine the match evidence for the feature obtained in block 1008 compared to the proto-feature obtained in block 1020. After determining the match evidence, block 1024 then determines whether the evidence returned from FIG. 11 is greater than the best evidence determined so far. If the evidence is greater than BEST, block 1024 transfers to block 1026 which sets BEST equal to the new evidence. If the evidence is less than or equal to BEST, or after setting BEST equal to evidence, control transfers back to block 1012 to check the next proto-feature within the template. After all proto-features within the template have been processed, block 1012 transfers to block 1014 which adds the value of the variable BEST to the value of the variable TOTAL. Block 1014 then transfers back to block 1004 to determine whether all features within the character being analyzed have been processed. After all features in the character have been processed, block 1004 transfers to block 1016 which computes a variable EFAVG to the value of the variable TOTAL divided by the value of the variable NUMFEAT. Block 1018 then computes the value of a variable LFTOTAL equal to the value of the variable NUMFEAT multiplied by the value of a variable FEATLEN, which is the length of each feature. As described above the length of a feature extracted from a character being analyzed is always a fixed value, so the value of LFTOTAL is simply the value of the number of features multiplied by this fixed length. After computing the values for EFAVG and LFTOTAL, control returns to FIG. 9.

FIG. 11 shows a flow chart of the determine match evidence process called from block 1022 of FIG. 10. Referring now to FIG. 11, after entry, block 1102 determines whether the feature is within the bounding box of the template. As described above with respect to FIGS. 2 and 3, a proto-feature within a template has a bounding box defined for it. If a feature from a character being analyzed is located outside this bounding box, as defined by comparing the X and Y coordinates of the feature midpoint to the Xmin, Xmax, Ymin, and Ymax parameters defined above, the similarity of the feature to the proto-feature will be so large as to be beyond consideration. Therefore, if the feature is not within the bounding box, block 1102 transfers to block 1112 which sets the match evidence value to zero before returning to FIG. 10.

If the feature is within the bounding box, block 1102 transfers to block 1104 which computes a variable ANGLEDIFF to the square of the angle of the feature minus the angle of the proto-feature. The angle difference is computed is a circular fashion, that is, the difference between an angle of zero and an angle of 1 is zero and ANGLEDIFF is never greater than 0.5 squared, i.e. 0.25. After computing the angle difference, block 1104 transfers to block 1106 which computes the value of a distance variable by squaring the value of the parameter A for the proto-feature multiplied by the X location of the feature, plus the value of B for the proto-feature multiplied by the Y value of the feature, plus the value of the variable C for the proto-feature. The parameters A, B, and C were defined above with respect to FIGS. 2 and 3. This distance is the distance between the location of the center of the feature and the line of the proto-feature. Block 1108 then computes a similarity variable as the angle difference times a constant K, plus the distance computed in block 1106. The constant K is used to adjust the relative contribution of the angle difference and the distance difference to the similarity measure. In the present invention, the constant K is set to a value of one. After computing the similarity, block 1108 transfers to block 1110 which computes the match evidence by dividing the similarity by a constant SM, squaring this result, adding one to the square, and dividing all of this into one. In this manner, the match evidence will vary from zero to one where zero means no match, and one is a perfect match. The constant SM defines what values of similarity will map to an evidence value of 0.5, that is, the midpoint. In the system of the present invention, the constant SM is set to a value of 0.0075. After computing the match evidence, FIG. 11 returns to FIG. 10.

Figure 12:
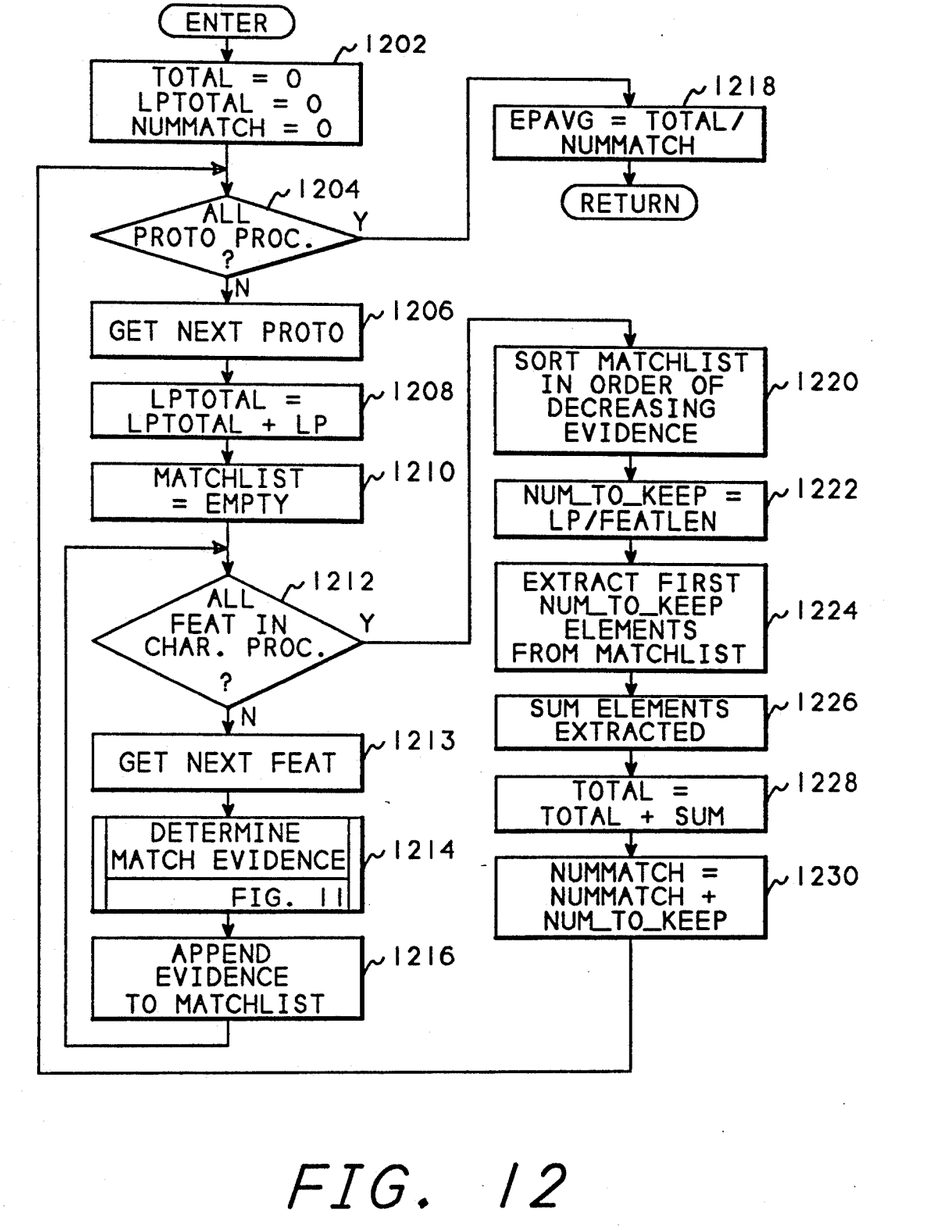

FIG. 12 shows a flow chart of the determine proto to features average process called from block 914 of FIG. 9. This process will match each proto-feature of the template to each feature from the character being analyzed. Referring now to FIG. 12, after entry, block 1202 sets 3 variables equal to zero, the variables TOTAL, LPTOTAL, and NUMMATCH. Block 1204 then determines whether all proto-features have been processed and if not, transfers control to block 1206 which gets the next proto-feature from the template. Block 1208 then adds the length of this proto-feature to the value of the variable LPTOTAL, and block 1210 sets the value of a variable called MATCHLIST to "empty". Block 1212 then determines whether all features in the character have been processed and if not, transfers control to block 1213 which gets the next feature. Block 1214 calls FIG. 11 to determine the match evidence between this feature and the proto-feature retrieved in block 1206. After returning from FIG. 11, block 1216 appends the match evidence from the comparison to MATCHLIST and then returns to block 1212 to process the next feature. After all features within the character have been processed, block 1212 transfers to block 1220 which sorts MATCHLIST in the order of decreasing evidence, thus, the features that most closely match this proto-feature would sort to the top of the list. Block 1222 then sets a variable NUM_TO_KEEP to the value of the length of this proto-feature divided by the feature length of the features from the character being analyzed. As discussed above, this feature length is a fixed number for all the features from the character being analyzed. Thus, the variable NUM_TO_KEEP identifies how many features would fit along the length of the proto-feature. Block 1224 then extracts this number of elements from the front of the match list and block 1226 adds the evidence values of all these elements together. Block 1228 then adds the sum just created to the value of the variable TOTAL. Block 1230 adds the value of the variable NUM_TO_KEEP to the value of the variable NUMMATCH before returning to block 1204 to determine if additional proto-features need to be processed for this template. After all proto-features have been processed for this template, block 1204 transfers to block 1218 which creates a value for the variable EPAVG by dividing the value of the variable TOTAL by the value of the variable NUMMATCH before returning EPAVG and LPTOTAL to FIG. 9.

After all characters have been analyzed, and a coded character selected for each character image, the coded characters are sent to a host system over the host system bus 616 (FIG. 6) via the system interface 608 (FIG. 6). The host system then stores the coded characters in a file where they can be processed using standard word processing systems.

It is also possible to use the features and match process described above to detect the presence of high-level features which are then used in a further matching process to classify a character. Using this process, templates contain high-level features, such as bays, closures, etc., rather that an entire character shape. Once the features have been extracted from an unknown character they are matched to the template, as described above, to identify the high-level features that are contained in the unknown character. Decision trees or other standard matching methods are then used to classify the unknown character based on the high-level features found.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A method for optical character recognition comprising the steps of:
   (a) converting a page having a plurality of text printed thereon into a graphical image containing a plurality of pixel elements representative of said text;
   (b) separating said graphical image into a plurality of character images;
   (c) scanning said character images to produce a set, containing a plurality of features, for each character image of said plurality of character images;
   (d) converting each of said sets of features into at least one coded character equivalent to each of said character images comprising the steps of
      (d1) selecting one of said sets,
      (d2) selecting one of a plurality of templates, one of said templates having been previously defined for each character to be converted, wherein each of said templates contains a plurality of proto-features,
      (d3) comparing each of said features to each of said proto-features to create a rating comprising the steps of
         (d3a) comparing each of said features from said selected set to each of said proto-features from said selected template to create an average feature match evidence,
         (d3b) comparing each of said proto-features from said selected template to each of said features from said selected set to create an average proto match evidence,
         (d3c) computing a rating by averaging said feature match evidence and said proto match evidence;
      (d4) adding said rating to a rating list,
      (d5) repeating steps (d2) through (d4) for each of said templates,
      (d6) selecting at least one highest rating within said rating list as said coded character equivalent to said character image, and
      (d7) repeating steps (d2) through (d6) for each of said character images; and
   (e) sending said coded characters to a word processor for editing and display.

2. The process of claim 1 wherein step (d3a) further comprises the steps of:
   (d3a1) selecting one of said features;
   (d3a2) selecting one of said proto-features;
   (d3a3) computing an angle difference value between an angle of said selected feature and an angle of said selected proto-feature;
   (d3a4) computing a distance difference value between a center of said feature and said proto-feature;
   (d3a5) computing a similarity as the sum of said angle difference value and said distance difference value;
   (d3a6) computing an evidence value by normalizing said similarity to a predetermined range of values;
   (d3a7) repeating steps (d3a2) through (d3a6) for each of said proto-features and selecting a highest of said evidence values;
   (d3a8) adding said selected highest evidence value to a total value;
   (d3a9) repeating steps (d3a1) through (d3a8) for each of said features; and
   (d3a10) dividing said total value by a number of features to create said average feature match evidence.

3. The process of claim 2 wherein step (d3a2) further comprises the steps of:
   (d3a2a) comparing a location of said selected feature to locations of each of said proto-features; and
   (d3a2b) setting said evidence value to zero and continuing with step (d3a7) if said feature is located outside a predefined area surrounding said proto-feature.

4. The process of claim 1 wherein step (d3b) further comprises the steps of:
   (d3b1) selecting one of said proto-features;
   (d3b2) selecting one of said features;
   (d3b3) computing an angle difference value between an angle of said selected feature and an angle of said selected proto-feature;
   (d3b4) computing a distance difference value between a center of said feature and said proto-feature;
   (d3b5) computing a similarity as the sum of said angle difference value and said distance difference value;
   (d3b6) computing an evidence value by normalizing said similarity to a predetermined range of values;
   (d3b7) repeating steps (d3b2) through (d3b6) for each of said features and appending each of said evidence values to a match list.
   (d3b8) sorting said match list;
   (d3b9) determining a largest number of integral features that will fit within a length of said proto-feature;
   (d3b10) selecting a number of evidence values from a first of said sorted match list equal to said largest number of integral features and adding said number to a number matched value;
   (d3b11) adding a sum of said selected number of evidence values to a total value;
   (d3b12) repeating steps (d3b1) through (d3b11) for each of said proto-features; and
   (d3b13) dividing said total value by said number matched value to create said average proto match evidence.

5. The process of claim 4 wherein step (d3b2) further comprises the steps of:
   (d3b2a) comparing a location of said selected feature to locations of each of said proto-features; and
   (d3b2b) setting said evidence value to zero and continuing with step (d3a7) if said feature is located outside a predefined area surrounding said proto-feature.

6. The process of claim 1 wherein step (c) further comprises the steps of:
   (c1) separating said character images into a plurality of outlines each defined by a boundary between pixels of different intensity within said character images;
   (c2) locating an arbitrary point on one of said outlines;

(c3) defining one of said plurality of features at said point and adding said feature to said set for said character image;

(c4) traversing said outline to a new point at a predetermined distance from said point;

(c5) repeating steps (c3) and (c4) until said outline is completely traversed; and (c6) repeating steps (c2) through (c5) for each of said outlines within said character image to complete said set; and (c7) repeating steps (c1) through (c6) for each of said character images.

7. A method for optical character recognition comprising the steps of:

(a) converting a page having plurality of text printed thereon into a graphical image containing a plurality of pixel elements representative of said text;

(b) separating said graphical image into a plurality of character images;

(c) scanning said character images to produce a set, containing a plurality of features, for each character image of said plurality of character images comprising the steps of (c1) separating said character images into a plurality of outlines each defined by a boundary between pixels of different intensity within said character images, (c2) locating an arbitrary point on one of said outlines, (c3) defining one of said plurality of features at said point and adding said feature to said set for said character image, (c4) traversing said outline to a new point at a predetermined distance from said point, (c5) repeating steps (c3) and (c4) until said outline is completely traversed, and (c6) repeating steps (c2) through (c5) for each of said outlines within said character image to complete said set;

(c7) repeating steps (c2) through (c6) for each of said character images;

(d) converting each of said sets of features into at least one coded character equivalent to each of said character images; and (e) sending said coded characters to a word processor for editing and display.

8. The process of claim 7 wherein step (d) further comprises the steps of:

(d1) selecting one of said sets;

(d2) selecting one of a plurality of templates, one of said templates having been previously defined for each character to be converted, wherein each of said templates contains a plurality of proto-features, (d3) comparing each of said features to each of said proto-features to create a rating;

(d4) adding said rating to a rating list;

(d5) repeating steps (d2) through (d6) for each of said templates;

(d6) selecting at least one highest rating within said rating list as said coded character equivalent to said character image, and (d7) repeating steps (d2) through (d6) for each of said character images.

9. The process of claim 8 wherein step (d3) further comprises the steps of:

(d3a) comparing each of said features from said selected set to each of said proto-features from said selected template to create an average feature match evidence, (d3b) comparing each of said proto-features from said selected template to each of said features from said selected set to create an average proto match evidence, (d3c) computing a rating by averaging said feature match evidence and said proto match evidence.

10. The process of claim 9 wherein step (d3a) further comprises the steps of:

(d3a1) selecting one of said features;

(d3a2) selecting one of said proto-features;

(d3a3) computing an angle difference value between an angle of said selected feature and an angle of said selected proto-feature;

(d3a4) computing a distance difference value between a center of said feature and said proto-feature;

(d3a5) computing a similarity as the sum of said angle difference value and said distance difference value;

(d3a6) computing an evidence value by normalizing said similarity to a predetermined range of values;

(d3a7) repeating steps (d3a2) through (d3a6) for each of said proto-features and selecting a highest of said evidence values (d3a8) adding said selected highest evidence value to a total value;

(d3a9) repeating steps (d3a1) through (d3a8) for each of said features; and (d3a10) dividing said total value by a number of features to create said average feature match evidence.

11. The process of claim 10 wherein step (d3a2) further comprises the steps of:

(d3a2a) comparing a location of said selected feature to locations of each of said proto-features; and (d3a2b) setting said evidence value to zero and continuing with step (d3a7) if said feature is located outside a predefined area surrounding said proto-feature.

12. The process of claim 9 wherein step (d3b) further comprises the steps of:

(d3b1) selecting one of said proto-features;

(d3b2) selecting one of said features;

(d3b3) computing an angle difference value between an angle of said selected feature and an angle of said selected proto-feature;

(d3b4) computing a distance difference value between a center of said feature and said proto-feature;

(d3b5) computing a similarity as the sum of said angle difference value and said distance difference value;

(d3b6) computing an evidence value by normalizing said similarity to a predetermined range of values;

(d3b7) repeating steps (d3b2) through (d3b6) for each of said features and appending each of said evidence values to a match list;

(d3b8) sorting said match list;

(d3b9) determining a largest number of integral features that will fit within a length of said proto-feature;

(d3b10) selecting a number of evidence values from a first of said sorted match list equal to said largest number of integral features and adding said number to a number matched value;

(d3b11) adding a sum of said selected number of evidence values to a total value;

(d3b12) repeating steps (d3b1) through (d3b11) for each of said proto-features; and (d3b13) dividing said total value by said number matched value to create said average proto match evidence.

13. The process of claim 12 wherein step (d3b2) further comprises the steps of:

(d3b2a) comparing a location of said selected feature to locations of each of said proto-features; and (d3b2b) setting said evidence value to zero and continuing with step (d3a7) if said feature is located outside a predefined area surrounding said proto-feature.

* * * * *